United States Patent [19]
Farchione

[11] Patent Number: 5,406,465
[45] Date of Patent: Apr. 11, 1995

[54] MOTORCYCLE LIGHT BAR ASSEMBLY

[75] Inventor: Robert Farchione, Waterford, Wis.

[73] Assignee: Harley-Davidson, Inc., Milwaukee, Wis.

[21] Appl. No.: 181,577

[22] Filed: Jan. 13, 1994

[51] Int. Cl.⁶ .............................................. B62J 6/00
[52] U.S. Cl. ........................................ 362/72; 224/31;
                                        362/234; 362/240; 362/245
[58] Field of Search ......................... 224/31, 42.03 B;
                                362/72, 234, 240, 245, 246, 249, 81

[56] References Cited

U.S. PATENT DOCUMENTS

| 3,788,532 | 1/1974 | Bish | 224/31 |
| 4,819,136 | 4/1989 | Ramsey | 362/81 |
| 4,858,088 | 8/1989 | Agabekov | 362/249 |

OTHER PUBLICATIONS

Harley-Davidson Motorcycles Genuine 1992 Accessories Catalog, p. 9.

Primary Examiner—Stephen F. Husar

[57] ABSTRACT

A light bar assembly for use on a motorcycle includes a housing having a pair of elongate cavities having reflective surfaces and arranged end to end and each being open at one side for defining a generally horizontally extending axis. A light transmitting lens covers each side opening and a lamp assembly is disposed in each cavity between the lens and the reflective surfaces and includes a plurality of lamps spaced apart in horizontal alignment in parallelism with the axis and an elongate diffuser is disposed between the lamp assembly and the lens. An elongate reflector is disposed between each lamp assembly and a central portion of each lens and in parallel with the axis for covering the central portion of each lens and the diffuser and for reflecting a portion of the light transmitted by the lamps backwardly onto the reflective surfaces for redirection through the diffuser and the uncovered portions of the lens. The light bar assembly is mounted by means of brackets and clamps on a pair of parallel horizontally extending rails fixed to the motorcycle.

5 Claims, 2 Drawing Sheets

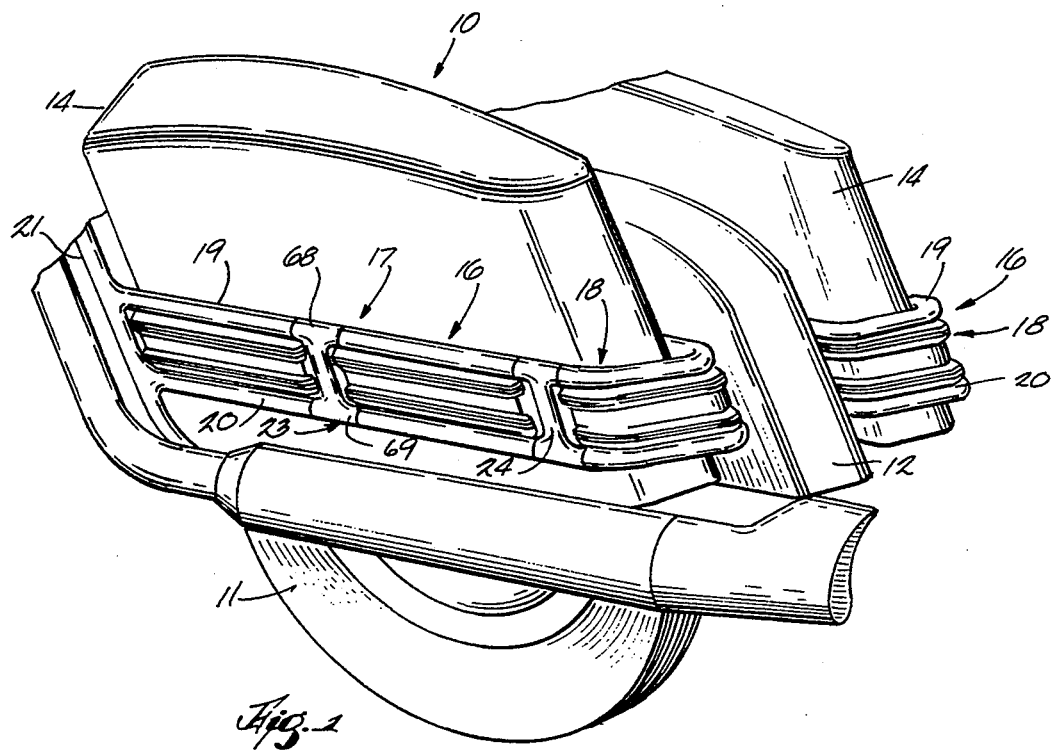
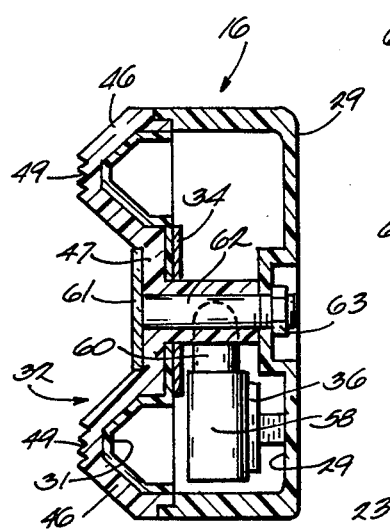

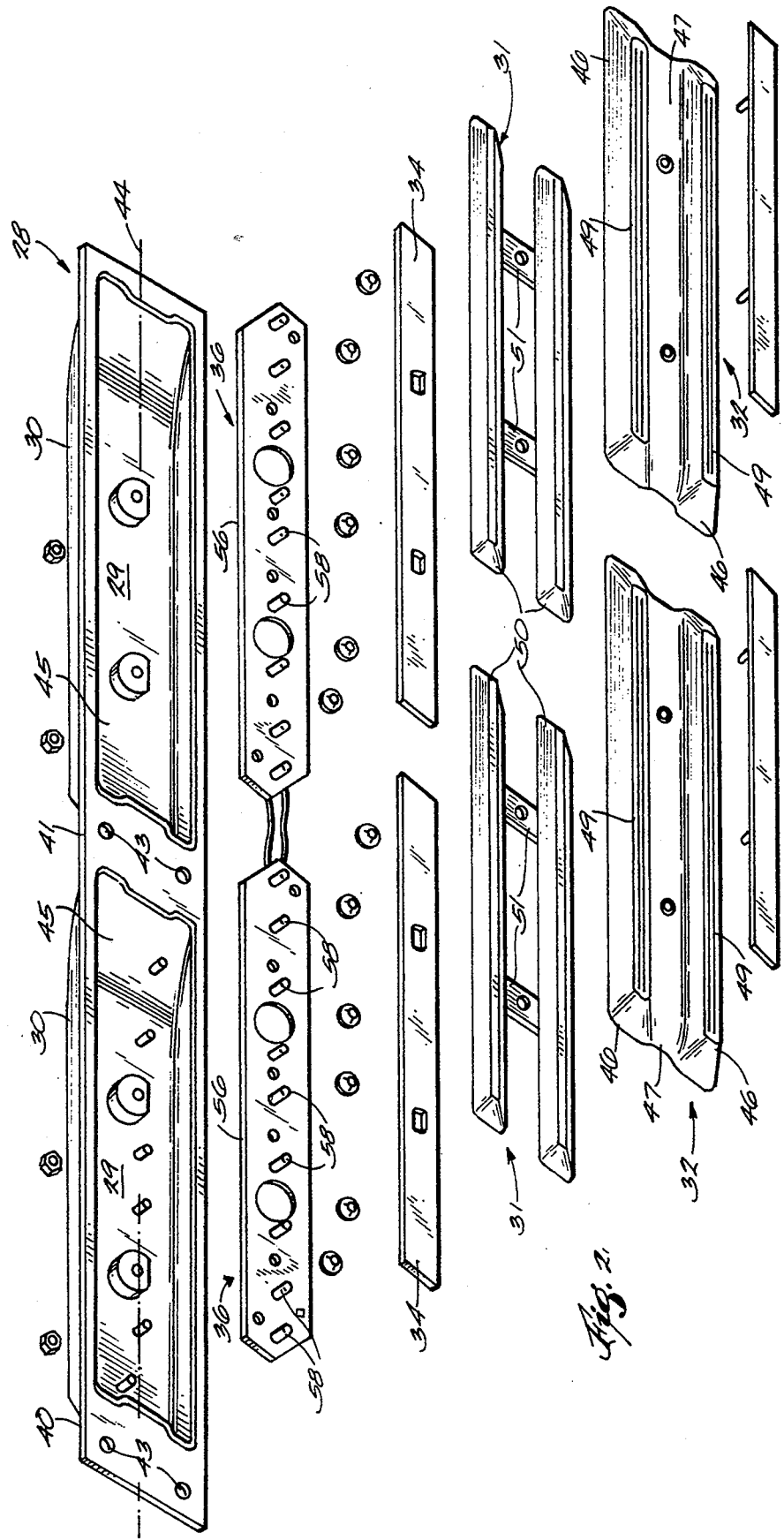

MOTORCYCLE LIGHT BAR ASSEMBLY

BACKGROUND OF THE INVENTION

This invention relates to motorcycles and more particularly to a motorcycle light bar.

Large touring motorcycles commonly include luggage carriers, mounted on the opposite sides of the rear wheel. It is a common practice to mount light bars along the sides and around the back of each luggage carrier. These are considered to be aesthetically pleasing and make the motorcycle more visible.

SUMMARY OF THE INVENTION

A primary object of the invention is to provide a new and improved motorcycle light bar assembly.

In general terms, the invention comprises a light bar assembly for use on a motorcycle and including a housing which defines at least one elongate generally horizontally extending cavity having a reflective surface and a side opening defining a horizontal axis, light transmitting lens means covering the opening, a lamp assembly disposed in the cavity and between the lens means and the reflective surface and including a plurality of lamps spaced apart horizontally in parallelism with the axis, an elongate diffuser disposed between the lens means and the lamp assembly and in parallelism with the axis and opposed to the side opening, elongate reflector means disposed between the lamps and a central portion of the diffuser and lens means and in parallelism with the axis and covering central portions of the lens and diffuser, the reflector means reflecting a portion of the light transmitted by the lamps backwardly onto the reflective surface for redirection through the uncovered portions of the lens means and diffuser.

BRIEF DESCRIPTION OF THE DRAWINGS

FIG. 1 shows the rear portion of a motorcycle which include light bars in accordance with the invention;

FIG. 2 is an exploded view of a light bar according to the invention;

FIG. 3 is a cross sectional view through a light bar according to the invention;

FIGS. 4 and 5 illustrate how the light bar assembly of FIGS. 2 and 3 are mounted on a motorcycle.

DETAILED DESCRIPTION OF THE PREFERRED EMBODIMENT

FIG. 1 shows the rear of a motorcycle 10 having a rear wheel 11, a fender 12 and a pair of luggage carriers 14, mounted in a conventional fashion. A metallic rail assembly 16 is suitably attached to the motorcycle and each is suitably connected to the frame of the motorcycle 10. Mounted on each rail assembly 16 and disposed adjacent each of the luggage carriers 14 are light bar assemblies 17 and 18.

Each rail assembly consists of a pair of parallel, spaced apart rails 19 and 20 which are joined at their front ends by a tubular support 21 which is secured to the frame of the motorcycle 10. There are, in addition, two clamp members 23 and 24 which assist in holding the rails in a parallel spaced apart relation, and support the light bar assemblies 17 and 18.

The light bar assembly 17 is shown in FIG. 2 to include a side housing 28 having a pair of cavities 29 and a diffuser 31, a lens 32, a side reflector 34 and a lamp assembly 36 associated with each cavity 29. The side housing 28 is an elongate member formed of any suitable materials such as plastic or sheet metal and the cavities 29 are defined by a pair of elongate shallow depressions formed therein and which are open at one side. There is also a first planer area 40 at one end of the housing 28 and a second 41 between the cavities 29. Each of the planar areas 40 and 41 has a pair of mounting holes 43. The open side of the cavities 29 may have any convenient shape consistent with the rail assembly in which it is mounted. In the illustrated embodiment, this opening is generally a parallelogram. The cavities 29 in housing 28 define a horizontal axis 44. The surface 45 of each cavity 29 has a reflective coating, which may take any suitable form, such as a white, glossy paint.

Each diffuser 31 may comprise a relatively thin formed member of translucent plastic which is sized and configured to be received within and conforms to the inner surface configuration of the lens 32.

The lenses 32 are each sized and configured in plan view to be received over and cover one of the open sides of the cavities 29 and each includes a pair of longitudinally extending, parallel, spaced ridge portions 46 which are generally V-shaped in transverse section. Between the ridge portions 46 and along the center of the lens 32 there is an elongate planer portion 47. At the apex of each ridge portion 46 there is a plurality of longitudinally extending serrations 49. Preferably, the lenses 32 are formed of a transparent, red or amber colored plastic material. The side reflectors 34 each comprise a flat strip of a silver colored reflective material sized to cover the inner surface of the planer portion 47 of each lens 32 and the corresponding portion of the diffuser 31. In the illustrated embodiment, the diffuser 31 is shown to comprise a pair of sections 50 which are each complimentary to the inner surface of one of the ridge portions 46 and are interconnected by cross portions 51. However, in the assemblies 18 at the rear of the luggage carriers 14, the diffusers may be generally planer.

The lamp assemblies 36 consist of a printed circuit board 56, having a plurality of lamps 58. The circuit boards 56 electrically connect the lamps 58 in a parallel circuit relation and the two boards 56 are connected in series with the combination connected to the vehicle's electrical system in a conventional manner.

In assembly, the diffusers 31 are mounted on the inner surface of the lens 32 and reflector strips 34 are fixed to the inner surface of the diffuser opposite the planer portion 47 of each lens 32 in any suitable manner, such as by an adhesive. The lamp assemblies 36 are suitably mounted within the cavities 29 with the center line of the lamps 60 parallel with and adjacent the axis 44. The lenses 32 are mounted on the housing 28 over the openings in cavities 29 in any suitable manner, such as by a trim strip 61 having a pair of threaded studs 62 which pass through aligned openings in the housing 28 and the lens 16 and are secured by nuts 63. This places the center lines of the lens 32, the diffuser 31 and reflector 34 in horizontal alignment with the axis 44 of the housing 28.

When the lamps 60 are energized, light rays striking the reflector 34 will be reflected back onto the reflective surfaces 45 for redirection back through the diffuser 31 along with direct light rays from the lamps 60. This light will be scattered by the diffuser 31 and projected through the lenses 32 where it is further refracted. This provides two bands of relatively uniform light along the length of each of the ridge portions 46 of each lens 32.

The light bar assembly may be limited to the light bar 17 mounted adjacent to the side of the luggage carrier 14 or a second light bar 18 may also be mounted to the rear of each carrier 14 as shown in FIG. 1. The light bar 18 includes a housing, a lens, a diffuser, a reflector and a lamp assembly similar to that discussed with respect to the light bar assembly 17 except that the assembly 18 is generally U-shaped to encompass the back portion of the luggage of the carrier shown in FIG. 1.

FIGS. 4 and 5 show the manner in which the light bar assemblies 17 and 18 are mounted on the rails 19 and 20. In particular, a first bracket 64 is fixed between rails 18 and 19 and on the inner side thereof and the first clamping member 23 is disposed on the opposite side thereof. The member 23 includes a shank portion 66 and a pair of end portions 68 and 69, each of which is a cylindrical section whose axis is parallel to each other and formed at an angle relative to the shank portion 66 as seen in FIG. 1. A pair of nuts 71 are fixed to the inner surface of the shank portion 66 and are spaced apart the same distance as the holes 43 in the planar portion 41 of the side housing 30. A pair of screws 73, which pass through aligned openings in bracket 64, holes 43 info, planar portion 41 and into nuts 71, fix the side housing 28 between the bracket 64 and the clamping member 23.

In a similar manner, the light bar assembly 16 is secured to the back of the rails 19 and 20 by clamping member 24. If a light bar assembly 18 is also provided, the planar portion 40 of housing 30 will be overlapped by the planar portion 76 of light bar assembly 18 and the holes 43 will be aligned with corresponding holes 77 in the end portion 76. Screws 78 passing through the aligned openings in the end portions 40 and 76 and into nuts 80 secured to member 24 secure the light bars 17 and 18 to the rails 19 and 20.

While only a single embodiment of the invention has been illustrated and described and is not intended to be limited thereby but only by the scope of the appended claims.

I claim:

1. A light bar assembly for use on a motorcycle, said light bar assembly including a housing having an elongate generally horizontally extending side opening defining a horizontal axis, said housing having a reflective surface opposite said side opening, elongate light transmitting lens means covering said opening and having longitudinally extending upper and lower ridges and an elongate central portion disposed therebetween and parallel to said axis, a lamp assembly disposed in said housing and between said housing and said lens and including a plurality of lamps spaced apart in horizontal alignment and in parallelism with said axis, an elongate diffuser disposed in said housing between said lamp assembly and said lens and in parallelism with said axis and opposed to said side opening, elongate reflector means disposed between said lamps and a central portion of said diffuser for substantially covering said central portion and for defining longitudinally extending elongate uncovered portions of said lens means and said diffuser between said central portions and the upper and lower ridges, said reflector means extending in parallelism with said axis for reflecting light emitted by said lamps backwardly onto said reflective surface for redirecting said light forwardly through the diffuser and the uncovered portions of said lens means.

2. The light bar assembly set for in claim 1 wherein the longitudinally extending portions of said lens means are generally V-shaped in transverse cross-sections and each has a plurality of serrations at the apex thereof.

3. The light bar set forth in claim 2 wherein said housing has means defining a pair of elongate recesses disposed in an end-to-end relation and defining a pair of side openings, an elongate diffuser disposed in each said recesses and in parallelism with the horizontally extending axis and opposed to said side openings, a light transmitting lens means covering each of said openings, a lamp assembly disposed in each of said recesses and between said diffuser and said housing and including a plurality of lamps spaced apart in horizontal alignment and in parallelism with said axis, said diffuser means diffusing light reflected from said reflective surface and direct light from said lamp assembly transmission of said diffused light through said lens means.

4. The light bar assembly set forth in claim 3 and including a pair of support rails constructed and arranged to be mounted on a motorcycle in a horizontally extending parallel spaced apart relation, at least one clamp member having a pair of end portions configured respectively to engage a different one of said rail means, and a shank portion disposed therebetween, bracket means fixed to and extending between said rail means and threaded fastener means for clamping said light bar means between said bracket and said clamp member.

5. The light bar set forth in claim 4 wherein the longitudinally extending portions of said lens means are generally V-shaped in transverse cross-sections and each has a plurality of serrations at the apex thereof.

* * * * *